US012780279B2

(12) United States Patent
Gao et al.

(10) Patent No.: US 12,780,279 B2
(45) Date of Patent: Nov. 3, 2026

(54) PORTABLE FOLDING WAGON

(71) Applicant: Zhejiang Chaoyang Machinery Co., Ltd., Wuyi County (CN)

(72) Inventors: Chaoyang Gao, Wuyi County (CN); Zhenen Gao, Wuyi County (CN)

( * ) Notice: Subject to any disclaimer, the term of this patent is extended or adjusted under 35 U.S.C. 154(b) by 176 days.

(21) Appl. No.: 18/967,492

(22) Filed: Dec. 3, 2024

(65) Prior Publication Data

US 2026/0152219 A1 Jun. 4, 2026

(51) Int. Cl.

| | |
|---|---|
| ***B62B 3/02*** | (2006.01) |
| ***B62B 1/12*** | (2006.01) |
| ***B62B 5/06*** | (2006.01) |

(52) U.S. Cl.

CPC .................. *B62B 3/02* (2013.01); *B62B 1/12* (2013.01); *B62B 5/067* (2013.01); *B62B 2205/14* (2013.01)

(58) Field of Classification Search

CPC .. B62B 3/02; B62B 1/12; B62B 5/067; B62B 2205/14; B62B 2205/12

See application file for complete search history.

(56) References Cited

U.S. PATENT DOCUMENTS

| | | | | |
|---|---|---|---|---|
| 4,322,093 | A * | 3/1982 | Otto | A61G 5/101 280/250.1 |
| 6,974,140 | B2 * | 12/2005 | Neuman | B62B 3/108 403/322.2 |
| 7,784,816 | B2 * | 8/2010 | Jian | B62B 3/02 280/38 |
| 12,187,335 | B2 * | 1/2025 | Jian | B60B 33/0023 |

FOREIGN PATENT DOCUMENTS

| | | | | |
|---|---|---|---|---|
| CN | 201362271 Y | * 12/2009 | | |
| CN | 210478742 U | * 5/2020 | | B62B 5/067 |
| CN | 212022741 U | * 11/2020 | | |
| JP | 7340507 B2 | * 9/2023 | | |

OTHER PUBLICATIONS

JP-7340507-B2 English Translation (Year: 2023).*
CN-212022741-U English Translation (Year: 2020).*
CN-210478742-U English Translation (Year: 2020).*
CN-201362271-Y English Translation (Year: 2009).*

* cited by examiner

*Primary Examiner* — Michael T. Walsh

(74) *Attorney, Agent, or Firm* — Sandy Lipkin

(57) ABSTRACT

Disclosed is a portable folding wagon, including a carrying plate provided with a lifting part, a connecting rod fixed on a pressing plate, a caster rotatably mounted on the connecting rod by a wheel frame, a turnover limiting member slidably mounted on the connecting rod and limiting the caster to rotate on the connecting rod by a concave-convex cooperating structure, a first spring elastically acting on the turnover limiting member to attach to the caster, a torsion spring acting on the caster for rotation and storage, a grip slidably connected to the lifting part, and a pull rod rotatably connecting the grip and the turnover limiting member. When the lifting part and the grip are kneaded, the turnover limiting member can be separated from the caster, and the torsion spring can act on the caster to rotate and attach to the carrying plate for storage, which is simple and convenient.

10 Claims, 17 Drawing Sheets

PORTABLE FOLDING WAGON

TECHNICAL FIELD

The present invention relates to the technical field of wagons and the folding of wagon wheels, and in particular to a portable folding wagon.

BACKGROUND

A wagon is used as a tool for carrying articles in daily households or in places not accessible by a vehicle. The wagon is equipped with casters to save effort when pushing and pulling the wagon. When the wagon is not in use, casters of some wagons can be folded to reduce the space occupied by the wagon.

Chinese Patent Application CN214929884U provides a caster folding structure for a flatbed cart. When casters need to be folded, a pushing part of a pushing handle needs to be turned over, so that the pushing part is horizontal to a fixing part of the pushing handle; and the pushing handle is pushed into a positioning strip-shaped hole below a supporting plate, so that a positioning pin passes through two positioning beads and is separated from a clamping positioning groove. When entering the positioning strip-shaped hole, a front end of the pushing part contacts two positioning blocks and pushes the two positioning blocks to move backward, so as to drive two sliding pipes and bolts and guide rods on the sliding pipes to move backward. The bolt is disengaged from an opening positioning groove, the guide rod is disengaged from the clamping positioning groove and then moves along a guide strip-shaped hole, and the bolt moves backward along an arc-shaped track, so that a caster fixing seat is changed from a vertical state to a horizontal state, and the casters are synchronously driven to be changed from an unfolded state to a folded state.

According to this patent application, the operation of folding casters by using a pushing handle is relatively complicated and requires a larger space, making the caster folding operation relatively inconvenient.

SUMMARY

In view of the problem that the operation of folding casters by using a pushing handle is relatively complicated and inconvenient in the prior art, the technical problem to be resolved by the present invention is to provide a portable folding wagon that has a simple and convenient caster folding operation.

To resolve the above technical problem, the present invention adopts the following technical solution. A portable folding wagon includes a carrying plate assembly, wherein the carrying plate assembly includes a carrying plate, a connecting rod fixed on the carrying plate, a plurality of casters rotatably mounting on the connecting rod, a turnover limiting member slidably mounted on the connecting rod and capable of limiting rotation of the casters on the connecting rod, and a first spring elastically acting on the turnover limiting member;

the caster includes a wheel frame rotatably mounted on the connecting rod, the turnover limiting member and the wheel frame are limited with cooperation of a concave-convex structure, the first spring elastically acts on the concave-convex structure between the turnover limiting member and the wheel frame, and the turnover limiting member can limit the wheel frame to be used perpendicular to the carrying plate or to be stored in close contact with the carrying plate;

the carrying plate is provided with a lifting part, a grip is slidably mounted at the lifting part or on the carrying plate, a second spring with elastic action is arranged between the lifting part and the grip, a pull rod is connected between the grip and the turnover limiting member, the pull rod is rotatably connected to the grip and the turnover limiting member, and the caster includes a torsion spring capable of acting the caster to be rotationally stored; and when the lifting part and the grip are kneaded, the grip can pull the turnover limiting member away from the wheel frame by the pull rod, and the torsion spring can act on the caster to rotate and attach to a lower portion of the carrying plate.

According to a preferred embodiment of the present invention, an adsorption member is fixed below the carrying plate, and the adsorption member can be adsorbed and connected to the caster by magnetic attraction.

According to a preferred embodiment of the present invention, the carrying plate is provided with an action port for a hand to insert, a cross bar is fixed below the carrying plate to attach to the lifting part, and the grip is slidably inserted between the lifting part and the cross bar and exposed in the action port.

According to a preferred embodiment of the present invention, when the casters are rotated and attached to a lower portion of the carrying plate, a storage cavity is formed between the plurality of casters.

According to a preferred embodiment of the present invention, a handle is rotatably mounted on the connecting rod, and the handle can be rotated into the storage cavity.

According to a preferred embodiment of the present invention, a rotation limiting member is slidably mounted on the connecting rod, the rotation limiting member can limit a rotation angle of the handle on the connecting rod with cooperation of a concave-convex structure, and a third spring is provided to elastically act on the rotation limiting member to attach to the handle.

According to a preferred embodiment of the present invention, one group of carrying plate assemblies is provided, and the handle can rotate to a lower portion of the carrying plate.

According to a preferred embodiment of the present invention, two groups of carrying plate assemblies are provided, the two groups of carrying plate assemblies are rotatably connected, the handle is rotatably mounted on a connecting rod in one group of carrying plate assemblies, two carrying plates can be turned downward and attached, and the handle can rotate to a position between the two carrying plates and is positioned in the storage cavity.

According to a preferred embodiment of the present invention, when the two carrying plates are horizontally unfolded, end surfaces between the carrying plates are attached to limit the upward turning of the two carrying plates.

According to a preferred embodiment of the present invention, a hooking and limiting member is rotatably mounted on the carrying plate, and the hooking and limiting member can hook and limit a relative rotation of the two carrying plates.

Compared with the prior art, the present invention has the advantages as follows: when a lifting part and a grip are kneaded, the grip is retracted relative to the lifting part, and the grip drives a turnover limiting member to slide by a pull rod, so that the limiting of a concave-convex structure between the turnover limiting member and a wheel frame is relieved, casters can be attached to a carrying plate for storage under the action of a torsion spring, and the storage operation of the casters is simple and convenient.

BRIEF DESCRIPTION OF DRAWINGS

The present invention is further described in detail below in conjunction with the accompanying drawings and preferred embodiments, but it is appreciated for those skilled in the art that these accompanying drawings are drawn only for the purpose of explaining the preferred embodiments and therefore should not be considered limiting of the scope of the present invention.

In addition, unless otherwise specified, the accompanying drawings only schematically represent the compositions or constructions of the described objects and may contain exaggerated displays, and the accompanying drawings are not necessarily drawn to scale.

Figure 1:
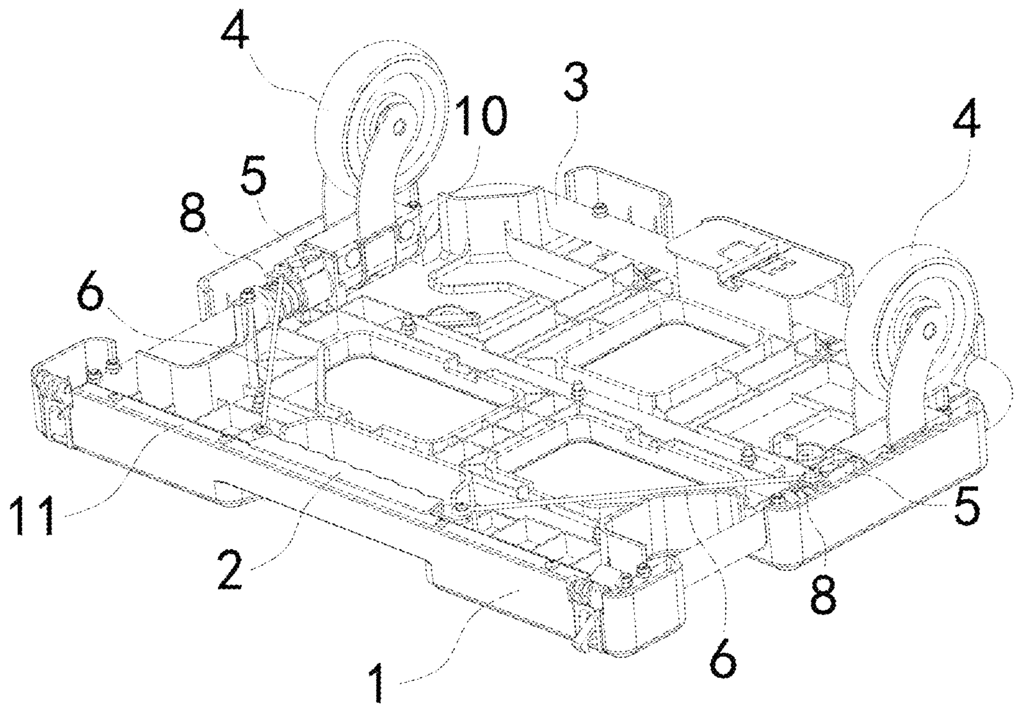
FIG. 1 is a schematic structural diagram of a carrying plate assembly according to a first preferred embodiment of the present invention.

In the drawings, 1: carrying plate, 1*a*: groove, 1*b*: first blocking wall, 1*c*: lifting part, 1*d*: guiding rib, 1*e*: blocking part, 1*f*: action port, 1*g*: movable port, 1*h*: avoidance port, 1*i*: counter bore, 1*j*: second blocking wall; 2: grip, 2*a*: guide groove; 3: connecting rod; 4: caster, 4*a*: seat body, 4*a* 1: accommodating cavity, 4*a* 2: first slot, 4*b*: frame body, 4*c*: roller; 5: turnover limiting member, 5*a*: guiding groove, 5*b*: first insertion block; 6: pull rod; 7: first torsion spring; 8: first spring; 9: first spacer; 10: second spacer; 11: cross bar; 12: spacing groove; 13: second spring; 14: adsorption member; 15: rotating and connecting member; 16: guiding pin; 17: handle; 17*a*: sleeve; 17*a*1: second slot; 17*b*: telescopic rod; 18: rotation limiting member; 18*a*: action part; 18*b*: sliding groove; 18*c*: second insertion block; 19: limiting pin; 20: third spring; 21: third spacer; 22: baffle plate; 23: attaching member; 24: first hinge member; 25: second hinge member; 26: hooking and limiting member; 26*a*: hooking part; 26*b*: pressing part; 27: hook rod; and 28: second torsion spring.

DETAILED DESCRIPTION OF EMBODIMENTS

The preferred embodiments of the present invention are described in detail below with reference to the accompanying drawings, and it is appreciated for those skilled in the art that these descriptions are merely illustrative and exemplary, and should not be construed as limiting the scope of the present invention.

It should be noted that similar reference numerals indicate similar items in the following accompanying drawings, and therefore, once an item is defined in one of the accompanying drawings, no further definition or explanation is required in the following accompanying drawings.

This embodiment mainly describes a portable folding wagon that can make the caster folding operation simple and convenient as follows:

Embodiment 1

As shown in FIGS. 1 to 12, a portable folding wagon includes one group of carrying plate assemblies and a handle 17 connected to the carrying plate assemblies, wherein the group of carrying plate assemblies includes a carrying plate 1, a grip 2 slidably connected to the carrying plate 1, a connecting rod 3 fixed on the carrying plate 1, a caster 4 rotatably mounted on the connecting rod 3, a turnover limiting member 5 slidably mounted on the connecting rod 3 and limiting turnover of the caster 4 by a concave-convex structure, a pull rod 6 rotatably connecting the grip 2 and the turnover limiting member 5, and a first torsion spring 7 capable of elastically acting on the caster 4 to rotate and attach to the carrying plate 1 for storage, and the handle 17 is connected on the connecting rod 3.

The carrying plate 1 is provided with a plurality of grooves 1*a* with lower openings, and the connecting rod 3 is arranged in the grooves 1*a* and is fixed on the carrying plate 1 by a plurality of groups of screws and nuts.

The carrying plate 1 is provided with two first blocking walls 1*b*, the caster 4 sleeved on the connecting rod 3 and the turnover limiting member 5 are positioned between the two first blocking walls 1*b*, a first spring 8 is sleeved on the connecting rod 3, the first spring 8 is positioned between the first blocking wall 1*b* and the turnover limiting member 5, and the first spring 8 elastically acts on a concave-convex structure between the turnover limiting member 5 and the caster 4 for tight cooperation.

To ensure the stability of the first spring 8 during compression or release, a first spacer 9 is arranged between the first spring 8 and the first blocking wall 1*b*, and to prevent the caster 4 from rubbing against the other first blocking wall 1*b* when rotating around the connecting rod 3, a second spacer 10 sleeved on the connecting rod 3 is arranged between the other first blocking wall 1*b* and the caster 4.

The carrying plate 1 is provided with a lifting part 1*c* and an action port 1*f* in a penetrating manner, a cross bar 11 is fixed on the carrying plate 1 by screws, a spacing groove 12 is left between the cross bar 11 and the lifting part 1*c*, a plurality of guiding ribs 1*d* are arranged in the spacing groove 12 on the lifting part 1*c* or the cross bar 11, the grip 2 is inserted on the cross bar 11, the grip 2 is provided with a guide groove 2*a* cooperating with the guiding rib 1*d*, and the cooperation between the guiding rib 1*d* and the guide groove 2*a* can limit the grip 2 to slide close to or away from the lifting part 1*c*.

To prevent the grip 2 from sliding off the cross bar 11, a blocking part 1*e* is provided on the carrying plate 1, the grip 2 is positioned between the blocking part 1*e* and the lifting part 1*c*, and an action port 1*f* is provided on the carrying plate 1 for a hand to insert. The action port 1*f* is positioned between the blocking part 1*e* and the lifting part 1*c*, the grip 2 is partially exposed in the action port 1*f*, a second spring 13 is provided between the grip 2 and the lifting part 1*c* or the cross bar 11, and the second spring 13 elastically acts on the grip 2 to move away from the lifting part 1*c* and attach to the blocking part 1*e* to limit sliding.

When the hand is inserted into the action port 1*f* and the lifting part 1*c* and the grip 2 are kneaded, the grip 2 is retracted relative to the lifting part 1*c*, and the grip 2 drives the turnover limiting member 5 to slide by the pull rod 6, so that the limiting of a concave-convex structure between the turnover limiting member 5 and a wheel frame is relieved, the caster 4 can be attached to the carrying plate 1 for storage under the action of a first torsion spring 7, and the storage operation of the caster 4 is simple and convenient. When the tight action between the lifting part 1*c* and the grip 2 is released, the turnover limiting member 5 is reattached to the caster 4 by the elastic action of a first spring 8, and the grip 2 is attached to the blocking part 1*e* by the elastic action of a second spring 13.

When the wagon is carried, the grip 2 is lifted and held without affecting the storage of the caster 4. To ensure that the caster 4 does not rotate on the connecting rod 3 due to shaking when the grip 2 is lifted, an adsorption member 14 is fixed below the carrying plate 1, and the adsorption member 14 is attached to the caster 4 by magnetic attraction to ensure the stability of the storage state of the caster 4.

Figure 2:
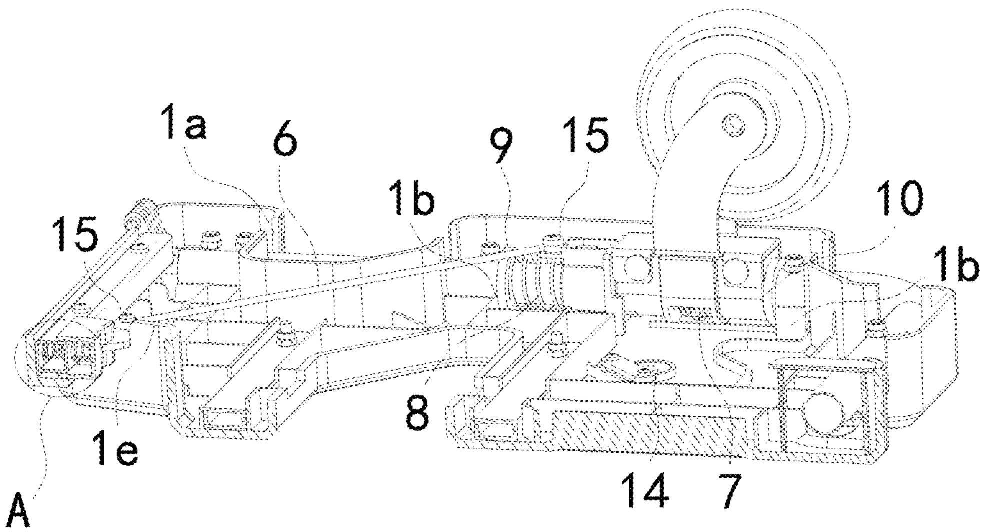
FIG. 2 is a first cross-sectional view of a carrying plate assembly according to a first preferred embodiment of the present invention.
Figure 3:
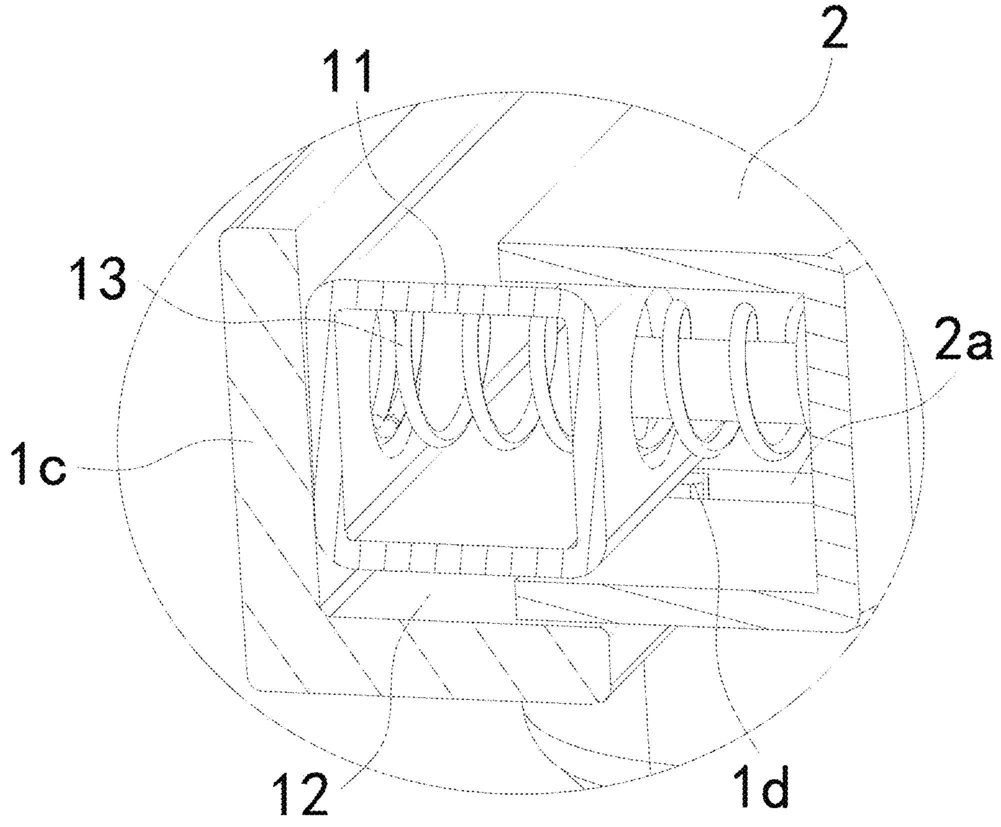
FIG. 3 is an enlarged schematic diagram of part A in FIG. 2 according to a first preferred embodiment of the present invention.
Figure 4:
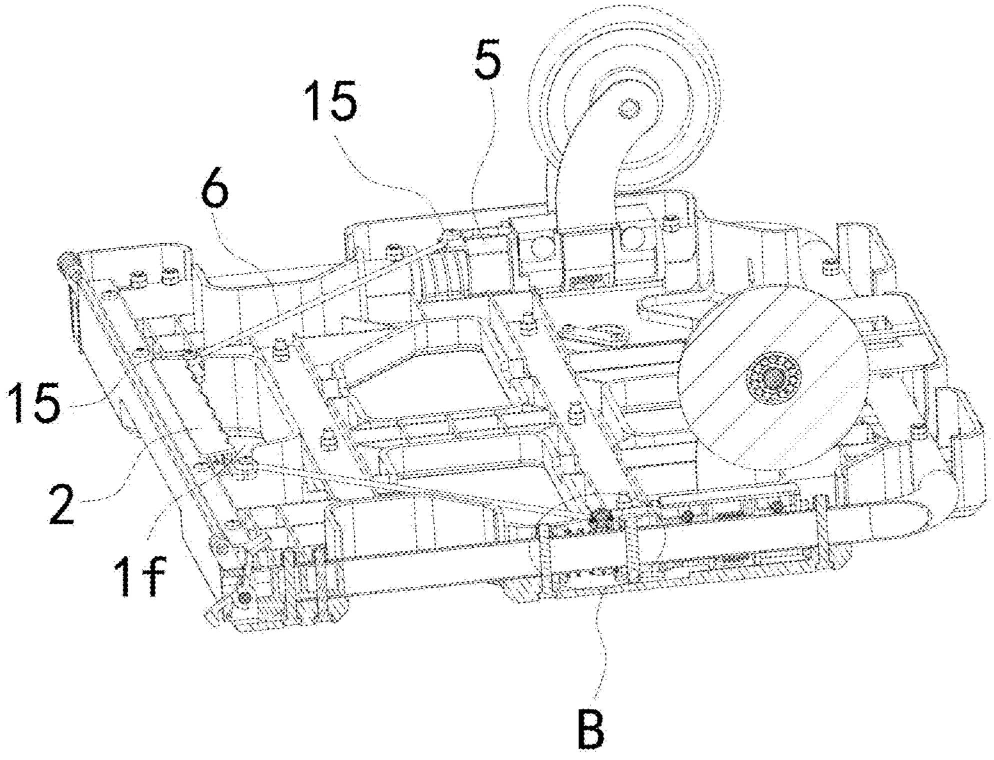
FIG. 4 is a second cross-sectional view of a carrying plate assembly according to a first preferred embodiment of the present invention.
Figure 5:
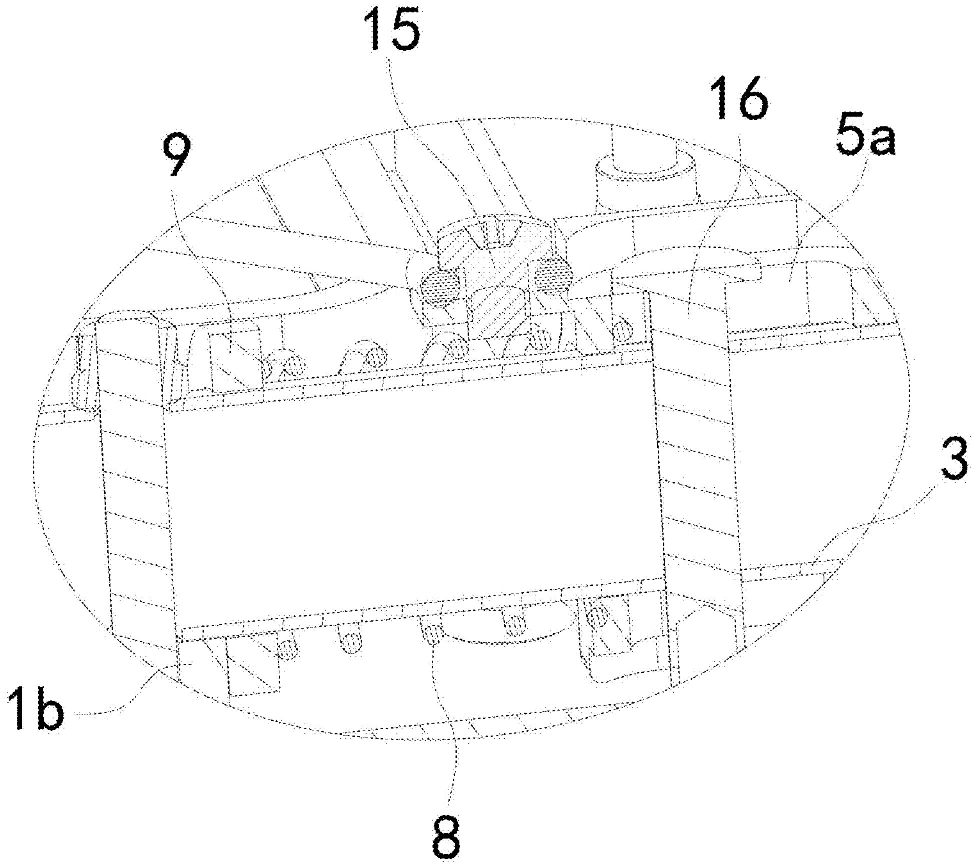
FIG. 5 is an enlarged schematic diagram of part B in FIG. 4 according to a first preferred embodiment of the present invention.
Figure 6:
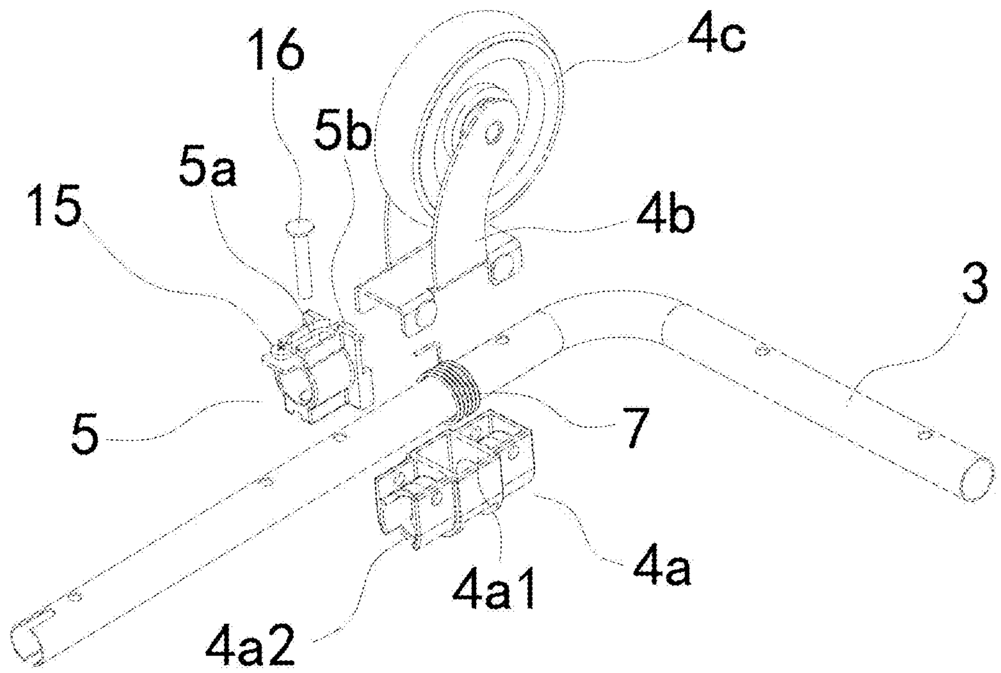
FIG. 6 is an exploded view of a caster, a turnover limiting member, and a connecting rod according to a first preferred embodiment of the present invention.
Figure 7:
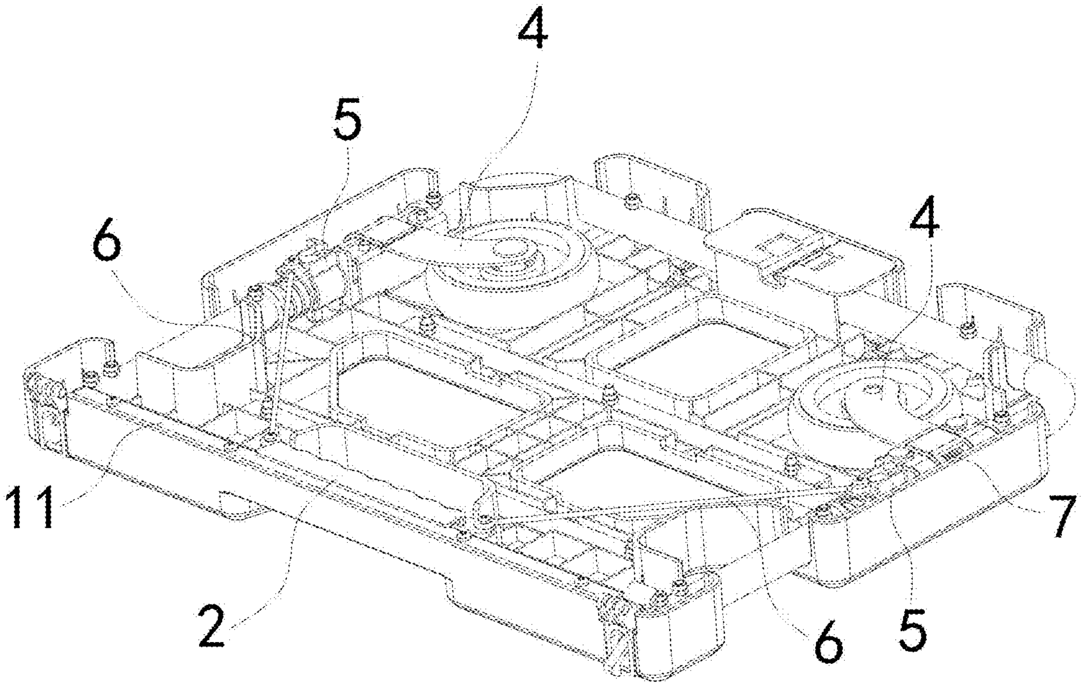
FIG. 7 is a schematic structural diagram of casters of a carrying plate assembly in a folded state according to a first preferred embodiment of the present invention.
Figure 8:
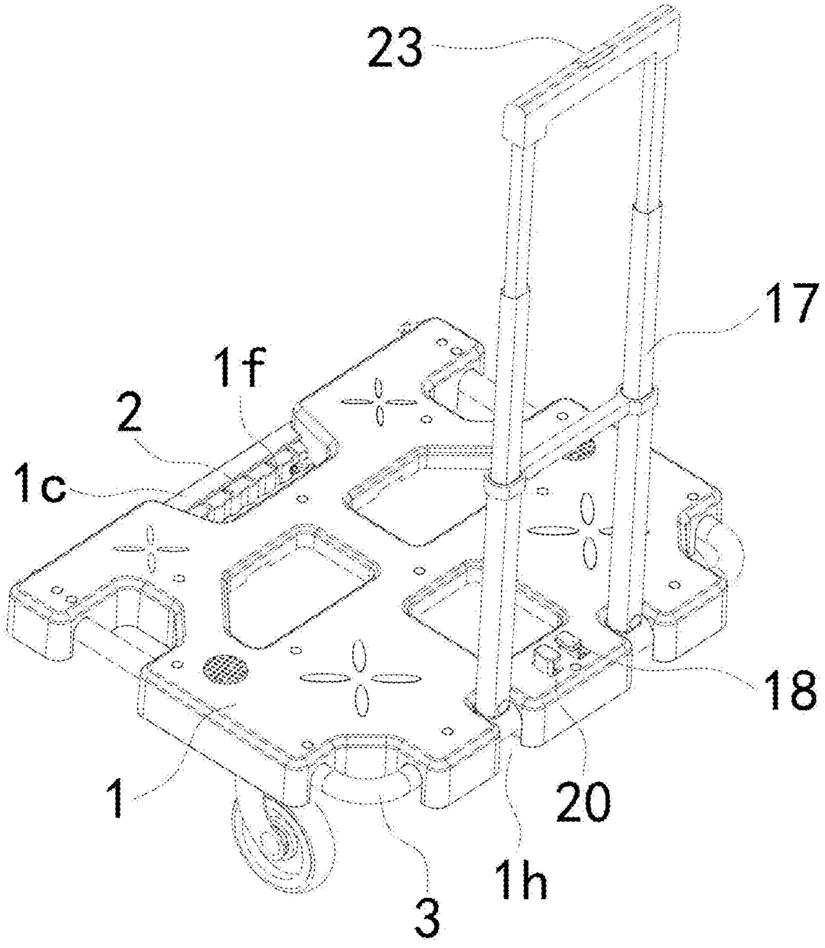
FIG. 8 is a schematic structural diagram of a wagon according to a first preferred embodiment of the present invention.
Figure 9:
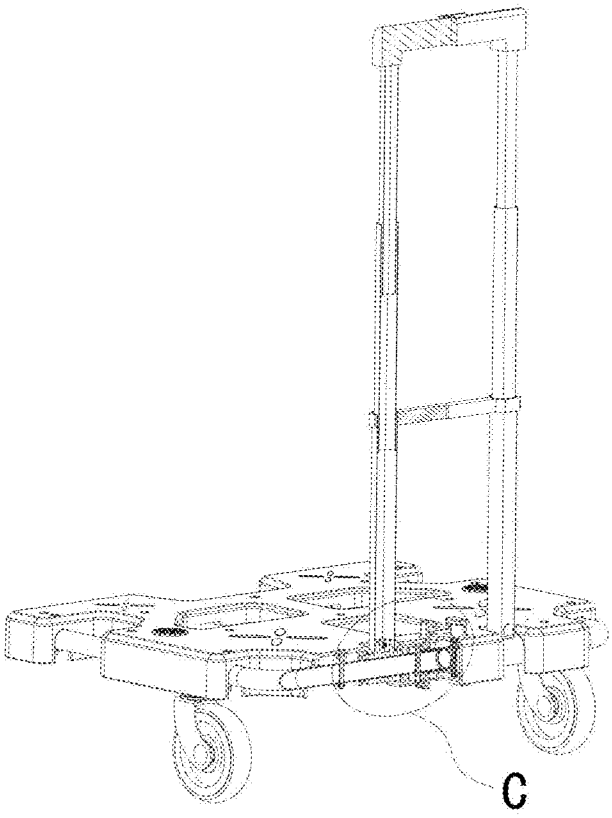
FIG. 9 is a cross-sectional view of a wagon according to a first preferred embodiment of the present invention.

As shown in FIGS. 2, 5 and 6, the grip 2 and the turnover limiting member 5 are each provided with a rotating and connecting member 15. In this embodiment, the rotating and connecting member 15 is connected to the grip 2 or the turnover limiting member 5 in a T-shaped structure, two ends of the pull rod 6 adopt a hook structure and rotatably hook the rotating and connecting member 15, and the rotating and connecting member 15 can limit the pull rod 6 from being separated. Preferably, the rotating and connecting member 15 may be a screw.

To prevent the rotation of the turnover limiting member 5 on the connecting rod 3, a guiding groove 5*a* is provided on the turnover limiting member 5, a guiding pin 16 is fixed on the connecting rod 3, and the guiding pin 16 is inserted into the guiding groove 5*a* and limits the turnover limiting member 5 to slide only on the connecting rod 3.

The caster 4 includes a seat body 4*a* rotatably sleeved on the connecting rod 3, a frame body 4*b* inserted on the seat body 4*a* and fixedly connected by screws and other accessories, and a roller 4*c* rotatably mounted on a wheel frame. The rotation axes of the seat body 4*a* and the roller 4*c* are not colinear and are not intersecting. To prevent the first torsion spring 7 from sliding along the connecting rod 3, an accommodating cavity 4*a*1 is provided on the seat body 4*a*, and the first torsion spring 7 inserted on the connecting rod 3 is positioned in the accommodating cavity 4*a*1 and elastically acts on the seat body 4*a* and the carrying plate 1.

In this embodiment, the seat body 4*a* is provided with a plurality of first slots 4*a*2 in a recessed manner, and the turnover limiting member 5 is provided with a first insertion block 5*b* in a protruded manner. Under the elastic action of the first spring 8, the first insertion block 5*b* on the turnover limiting member 5 can be inserted into a second insertion slot 17*a*1 on the seat body 4*a*, and under the limitation of the guiding pin 16, the rotation of the seat body 4*a* (i.e., the caster 4) on the connecting rod 3 is limited.

When the caster 4 is in the storage state, the turnover limiting member 5 has two action cases on the caster 4.

Case 1: the turnover limiting member 5 is only attached to the seat body 4*a* of the caster 4, there is no structure for the insertion of a first slot 4*a*2 and a first insertion block 5*b* between the turnover limiting member 5 and the seat body 4*a*, and the stability of the storage state of the caster 4 is achieved through the first torsion spring 7 and the adsorption member 14.

In this case, when the wagon is used by opening the caster 4, the caster 4 only needs to be manually operated to rotate around the connecting rod 3, so that the adsorption force of the adsorption member 14 and the torsion force of the first torsion spring 7 are overcome until the caster 4 rotates to the use state, that is, the first slot 4*a*2 of the seat body 4*a* corresponds to the first insertion block 5*b* of the turnover limiting member 5. Under the action of the first spring 8, the first insertion block 5*b* of the turnover limiting member 5 is inserted into the first slot 4*a*2 and limits the seat body 4*a* (i.e., the caster 4) to rotate, so that the wagon can be used for carrying articles.

Case 2: the turnover limiting member 5 is inserted into the first slot 4*a*2 of the seat body 4*a* by the first slot 4*a*2, and when the caster 4 is in the storage state, the caster 4 is acted by the turnover limiting member 5, the first torsion spring 7, and the adsorption member 14.

In this case, when the wagon is used by opening the caster 4, the grip 2 and the lifting part 1*c* of the carrying plate 1 need to be kneaded in advance, so that the first slot 4*a*2 inserted between the turnover limiting member 5 and the seat body 4*a* is separated from the first insertion block 5*b*; then the caster 4 is manually operated to rotate around the connecting rod 3 to overcome the adsorption force of the adsorption member 14 and the torsion force of the first torsion spring 7 until the caster 4 rotates to the use state, the grip 2 is released, the first insertion block 5*b* of the turnover limiting member 5 is inserted into the first slot 4*a*2 again under the action of the first spring 8 and limits the seat body 4*a* (i.e., the caster 4) to rotate, so that the wagon can be used for carrying articles.

Alternatively, the seat body 4*a* or the turnover limiting member 5 is provided with an attached inclined plane, the caster 4 is manually operated to rotate around the connecting rod 3 to overcome the adsorption force of the adsorption member 14 and the torsion force of the first torsion spring 7.

In this case, the seat body 4*a* can act on the turnover limiting member 5 to slide on the connecting rod 3 by the inclined plane and compress the first spring 8, the caster 4 rotates to the use state, that is, the first slot 4*a*2 of the seat body 4*a* corresponds to the first insertion block 5*b* of the turnover limiting member 5. Under the action of the first spring 8, the first insertion block 5*b* of the turnover limiting member 5 is inserted into the first slot 4*a*2 again and limits the seat body 4*a* (i.e., the caster 4) to rotate, so that the wagon can be used for carrying articles.

As shown in FIGS. 8 to 12, a sleeve 17*a* rotatably sleeved on the connecting rod 3 is provided on the handle 17, a rotation limiting member 18 is further sleeved on the connecting rod 3, the rotation limiting member 18 can limit the rotation of the sleeve 17*a* on the connecting rod 3 with cooperation of a concave-convex structure, a third spring 20 is further sleeved on the connecting rod 3, and the third spring 20 elastically supports the concave-convex structure between the rotation limiting member 18 and the sleeve 17*a* for tight cooperation.

When the caster 4 is rotated to a lower portion of the carrying plate 1 for storage, due to the thickness of the caster 4, at least two casters 4 are mounted on the carrying plate 1, a storage cavity is formed between the stored casters 4 below the carrying plate 1, and the handle 17 can be rotated to a lower portion of the carrying plate 1 and positioned in the storage cavity.

The carrying plate 1 is provided with a penetrating movable port 1g, the rotation limiting member 18 is provided with an action part 18*a*, the action part 18*a* is exposed above the carrying plate 1 from the movable port 1g, the rotation limiting member 18 slides on the connecting rod 3 by pushing the action part 18*a* of the rotation limiting member 18, the rotation limiting member 18 is separated from the concave-convex cooperation with the sleeve 17*a* of the handle 17, and the handle 17 can rotate on the connecting rod 3 relative to the carrying plate 1.

In this embodiment, an avoidance port 1*h* is provided on the carrying plate 1, and the avoidance port 1*h* passes through the upper and lower parts and is connected to a side wall of the carrying plate 1. The handle 17 further includes a telescopic rod 17*b* fixedly connected to the sleeve 17*a*. The telescopic rod 17*b* of the handle 17 can be rotated to the top of the carrying plate 1 for pushing and pulling or rotated to the bottom of the carrying plate 1 for storage by the avoidance port 1*h*.

According to the present application, the handle 17 can be rotated to the lower portion of the carrying plate 1, and the rotation limiting member 18 limits the handle 17, so that an upper end surface of the carrying plate 1 is not required to be provided with a storage groove for storing the handle 17. When the carried articles are placed on the carrying plate 1, the situation that the carried articles are placed unevenly can be effectively avoided, so that the carried articles can be normally stacked on the carrying plate 1, and the wagon can be normally pulled.

Figure 10:
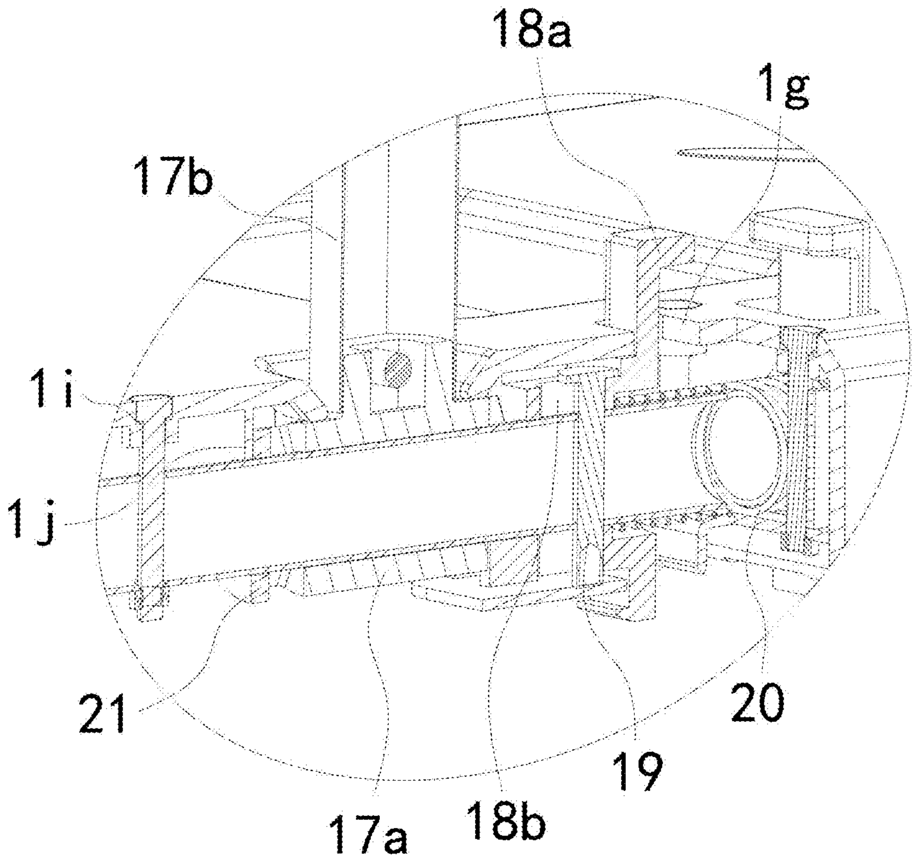
FIG. 10 is an enlarged schematic diagram of part C in FIG. 9 according to a first preferred embodiment of the present invention.
Figure 11:
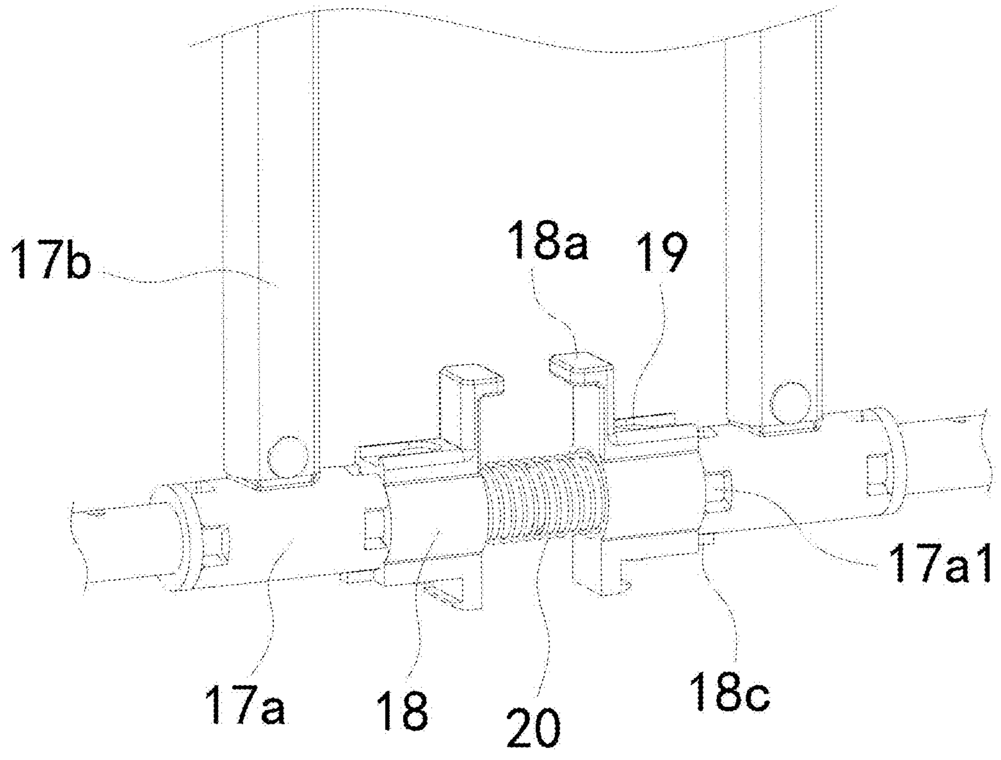
FIG. 11 is a schematic structural diagram of a handle and a rotation limiting member on a connecting rod of a wagon according to a first preferred embodiment of the present invention.

As shown in FIGS. 10 to 11, the sleeve 17*a* of the handle 17 is provided with a plurality of second slots 17*a*1 in a recessed manner, the second slots 17*a*1 are distributed around a rotation axis, the rotation limiting member 18 is provided with a second insertion block 18*c* capable of being inserted into the second slot 17*a*1, and the rotation angle of the handle 17 on the connecting rod 3, that is, the inclination of the handle 17 relative to the carrying plate 1, can be limited by the cooperation between the second insertion block 18*c* and the second slots 17*a*1 at different positions.

To prevent the rotation limiting member 18 from rotating on the connecting rod 3, the rotation limiting member 18 is provided with a sliding groove 18*b*, a limiting pin 19 inserted into the sliding groove 18*b* is fixed on the connecting rod 3, and when the rotation limiting member 18 slides along the connecting rod 3, the limiting pin 19 limits the rotation limiting member 18 to rotate on a connecting member and limits a sliding stroke of the rotation limiting member 18 on the connecting rod 3.

In other embodiments, the rotation limiting member 18 cooperates with the connecting rod 3 in a non-circular structure, such as an elliptical or polygonal structure, to limit the rotation of the rotation limiting member 18 on the connecting rod 3.

Figure 12:
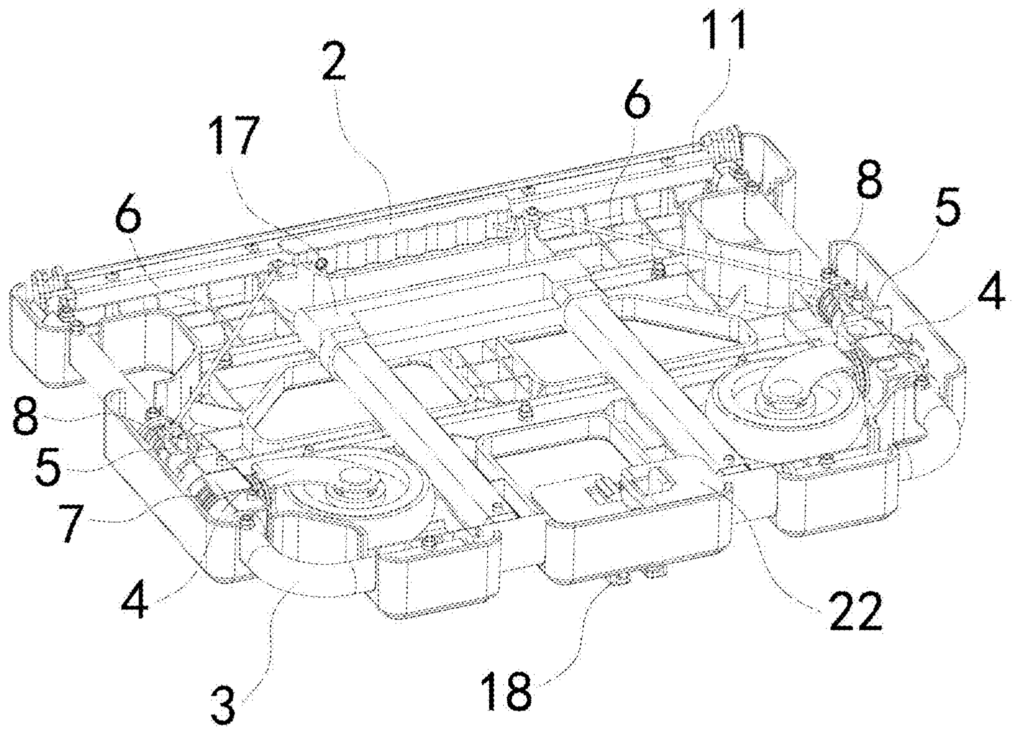
FIG. 12 is a schematic structural diagram of a wagon in a folded state according to a first preferred embodiment of the present invention.
Figure 13:
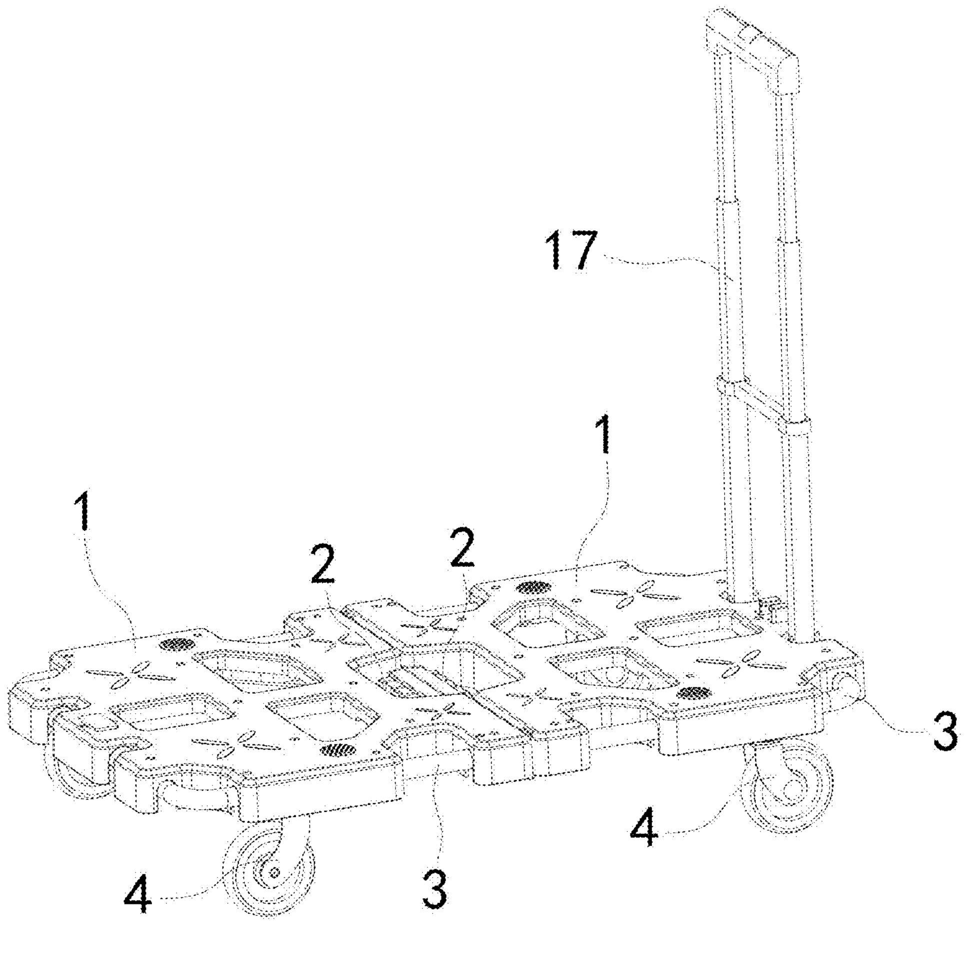
FIG. 13 is a schematic structural diagram of a wagon according to a second preferred embodiment of the present invention.
Figure 14:
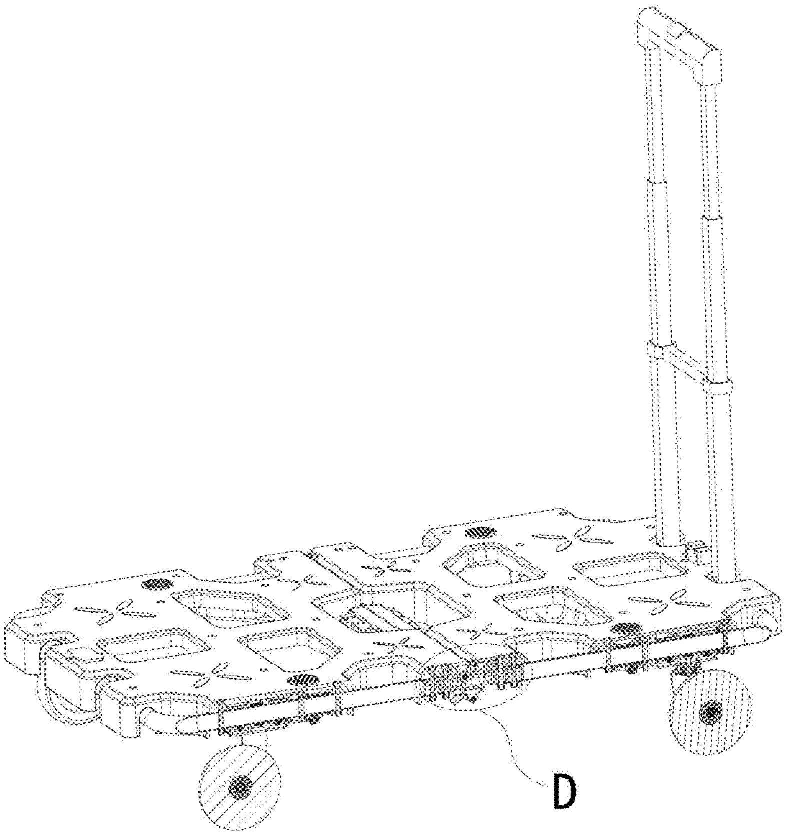
FIG. 14 is a cross-sectional view of a wagon according to a second preferred embodiment of the present invention.
Figure 15:
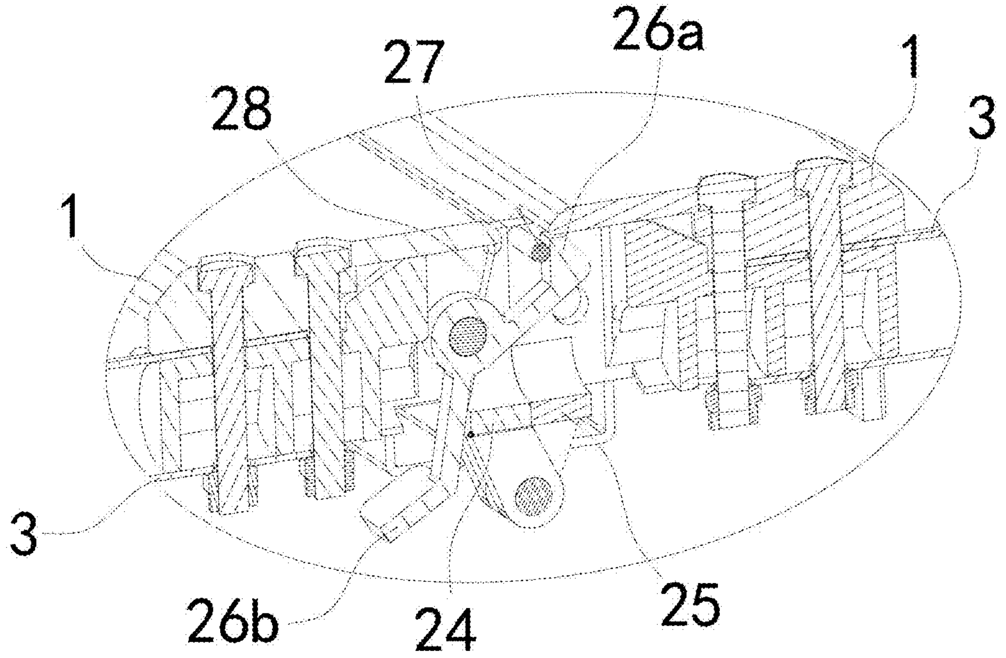
FIG. 15 is an enlarged schematic diagram of part D in FIG. 14 according to a second preferred embodiment of the present invention.
Figure 16:
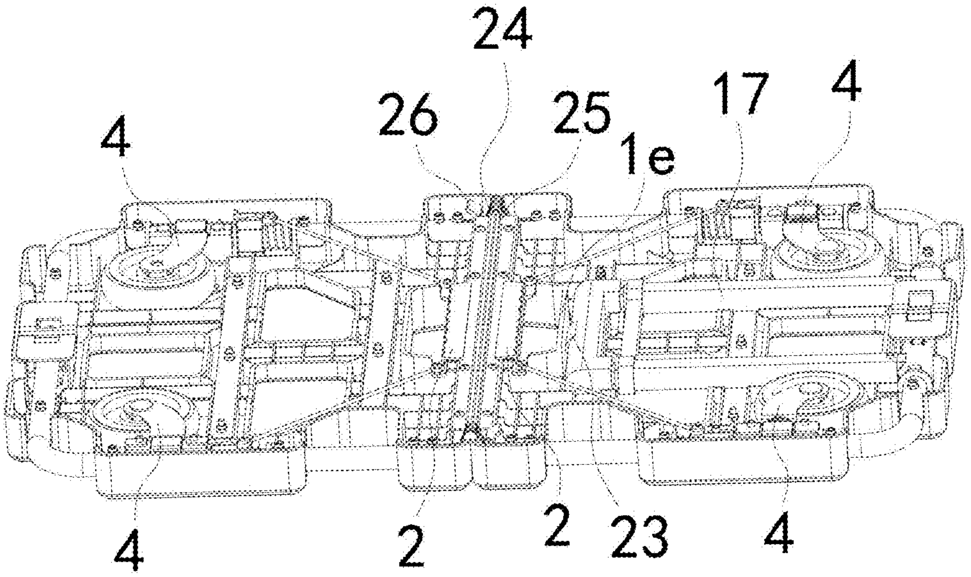
FIG. 16 is a schematic structural diagram of casters and a handle on a wagon in a folded state according to a second preferred embodiment of the present invention.
Figure 17:
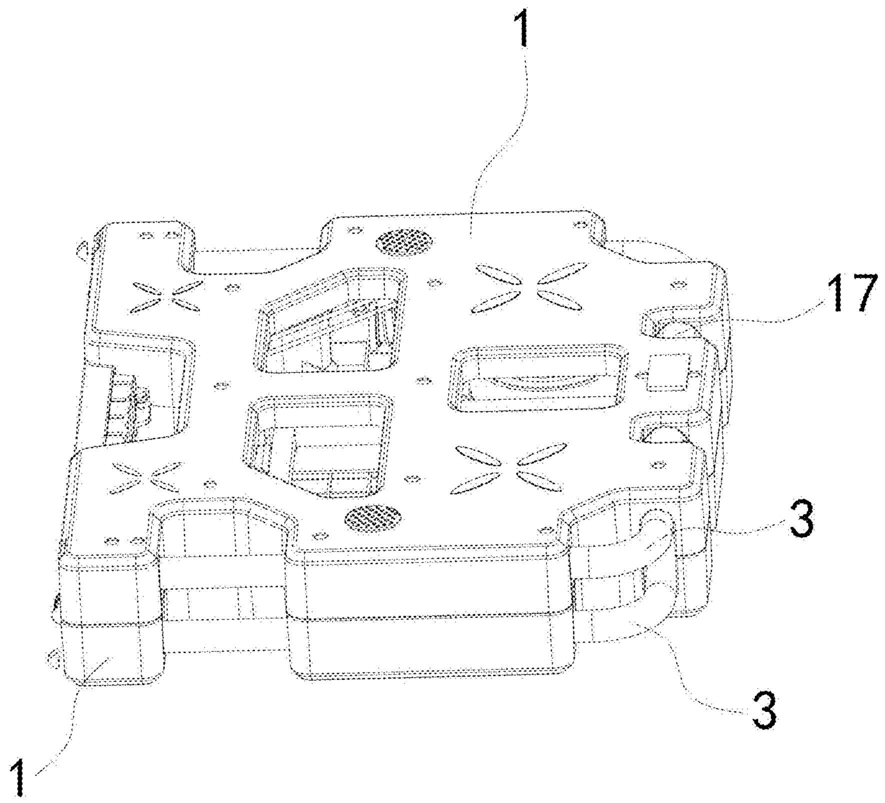
FIG. 17 is a schematic structural diagram of a wagon in a folded state according to a second preferred embodiment of the present invention.

As shown in FIGS. 11 to 12, two rotation limiting members 18 are provided to be sleeved on the connecting rod 3 and positioned between two sleeves 17*a* of the handle 17, and a third spring 20 is sleeved on the connecting rod 3 and positioned between the two rotation limiting members 18. Preferably, the third spring 20 may also be a tension spring, a rubber band, or other accessories.

To avoid the situation that the rotation limiting member 18 can drive the two sleeves 17*a* of the handle 17 to slide when sliding on the connecting rod 3, two second blocking walls 1*j* are provided below the carrying plate 1, and two rotating sleeves on the handle 17 are positioned between the two second blocking walls 1*j*. Meanwhile, to avoid the situation that the sleeve 17*a* of the handle 17 rubs against the second blocking wall 1*j* when rotating, a third spacer 21 is further provided and sleeved on the connecting rod 3, and the third spacer 21 is positioned between the sleeve 17*a* and the second blocking wall 1*j*.

In other embodiments, the rotation limiting member 18 may be arranged between the second blocking wall 1*j* and the sleeve 17*a* or the third spacer 21 and the sleeve 17*a*, and the third spring 20 may be arranged between the second blocking wall 1*j* and the rotation limiting member 18 or the third spacer 21 and the rotation limiting member 18.

Since the carrying plate 1 of the wagon has a lower height, to prevent muddy water on the ground from splashing between the rotation limiting member 18 and the sleeve 17*a* when the wagon is rolled and pulled by wheels, a baffle plate 22 is provided below the connecting rod 3, and the baffle plate is fixedly connected to the carrying plate 1 by cooperation between screws and nuts.

As shown in FIG. 10, an upper end surface of the carrying plate 1 is provided with a plurality of counter bores 1*i*, nuts of screws fixedly connected to the connecting rods 3 are positioned in the counter bores 1*i*, and the screws are in threaded connection with the connecting rod 3. Alternatively, the screws and the nuts cooperate to fixedly connect the carrying plate 1 and the connecting rod 3, the nuts or the nut caps of the screws are positioned in the counter bores 1*i*, and the nut caps of the screws and the nuts are clamped together to fix the carrying plate 1 and the connecting rod 3.

To facilitate the mounting of the caster 4, the turnover limiting member 5, the rotation limiting member 18, the sleeve 17*a* of the handle 17 and the like on the connecting rod 3 in a penetrating manner, in this embodiment, two connecting rods 3 are fixed on one carrying plate 1, the connecting rods 3 may be in an L-shaped structure, and two casters 4 are usually mounted in one group of carrying plate assemblies. Preferably, the connecting rods 3 may be in a straight-shaped structure.

In this embodiment, a telescopic rod 17*b* of the handle 17 is provided with an attaching member 23, and when the handle 17 rotates into the storage cavity, the attaching member 23 can be attached to the blocking part 1*e*. Preferably, the attaching member 23 may be made of soft elastic cotton or silica gel.

Embodiment 2

As shown in FIGS. 13 to 17, this embodiment is different from Embodiment 1 in that two groups of carrying plate assemblies are provided, and the two groups of carrying plate assemblies are rotatably connected. The handle 17 is mounted on the connecting rod 3 of the one group of carrying plate assemblies, a first hinge member 24 and a second hinge member 25 are mounted on the connecting rod 3 of the one group of carrying plate assemblies, the first hinge member 24 and the second hinge member 25 are positioned at the same side of the lifting part 1*c* of the carrying plate 1, and the two carrying plate assemblies are rotatably connected by two groups of first hinge members 24 and second hinge members 25. Preferably, the first hinge member 24 and the second hinge member 25 can bear a force exceeding 200 KG.

In this embodiment, the first hinge member 24 and the second hinge member 25 are each provided with an insertion section inserted into the connecting rod 3, and the screw for fixing the connecting rod 3 passes through the carrying plate 1 and the insertion section to be fixedly mounted, so as to prevent the first hinge member 24 or the second hinge member 25 from separating from the connecting rod 3.

A hooking and limiting member 26 is rotatably mounted on the first hinge member 24, the second hinge member 25 is provided with a hook rod 27, the hooking and limiting member 26 is provided with a hooking part 26*a* capable of hooking the hook rod 27, and the first hinge member 24 is further provided with a second torsion spring 28 elastically acting on the hooking and limiting member 26 for ensuring the stability of hooking between the hooking part 26*a* and the hook rod 27.

The hooking and limiting member 26 is further provided with a pressing part 26*b*, and the hooking and limiting member 26 can rotate and be separated from the hook rod 27 by pressing the pressing part 26*b*, so that the first hinge member 24 and the second hinge member 25 can rotate, that is, the two groups of carrying plate assemblies can rotate.

When the two carrying plates 1 are rotated to be horizontally unfolded, the hooking and limiting member 26 automatically hooks the hook rod 27 under the elastic action of the second torsion spring 28, the hooking and limiting member 26 automatically locks the first hinge member 24 and the second hinge member 25 to limit the rotation of the two carrying plates 1, and end surfaces of ends of the lifting parts 1*c* of the two carrying plates 1 are attached and limited to ensure the horizontal unfolding distribution of the two carrying plates 1. In this case, the lifting parts 1*c* of the two carrying plates 1 are arranged adjacently or attached to each other, the casters 4 in the two groups of carrying plate assemblies can be rotationally stored by meshing the grips 2 of the two carrying plate assemblies. When the two carrying plates 1 are relatively rotated to fold downwards to be attached, the handle 17 rotated to be stored below the carrying plate 1 is positioned between the two carrying plates 1, and the casters 4 rotated to the stored state are positioned between the two carrying plates 1.

In the description of the present invention, it should be noted that an orientation or position relationship indicated by terms "upper", "lower", "front", "rear", "inner", "outer", or the like is an orientation or position relationship based on the accompanying drawings, or an orientation or position relationship that the product of the present invention is usually placed when in use. These terms are merely used to facilitate and simplify description of the present invention, instead of indicating or implying that a mentioned apparatus or element must have a specific orientation or be constructed and operated in a specific orientation, and therefore the terms cannot be construed as a limitation on the present invention.

The portable folding wagon provided by the present invention is described in detail above. The principle and implementation mode of the present invention are described in detail using specific embodiments. The description of the above embodiments is only used to help understand the present invention and core concept thereof. It should be noted that, for those of ordinary skill in the art, without departing from the principle of the present invention, it is possible to make several improvements and modifications to the present invention, and those improvements and modifications also fall within the protection scope of the claims of the present invention.

What is claimed is:

1. A portable folding wagon, comprising: a carrying plate assembly, wherein the carrying plate assembly comprises a carrying plate, a connecting rod fixed on the carrying plate, a plurality of casters rotatably mounting on the connecting rod, a turnover limiting member slidably mounted on the connecting rod and capable of limiting rotation of the casters on the connecting rod, and a first spring elastically acting on the turnover limiting member;

the caster comprises a wheel frame rotatably mounted on the connecting rod, the turnover limiting member and the wheel frame are limited with cooperation of a concave-convex structure, the first spring elastically acts on the concave-convex structure between the turnover limiting member and the wheel frame, and the turnover limiting member can limit the wheel frame to be used perpendicular to the carrying plate or to be stored in close contact with the carrying plate;

the carrying plate is provided with a lifting part, a grip is slidably mounted at the lifting part or on the carrying plate, a second spring with elastic action is arranged between the lifting part and the grip, a pull rod is connected between the grip and the turnover limiting member, the pull rod is rotatably connected to the grip and the turnover limiting member, and the caster comprises a torsion spring capable of acting the caster to be rotationally stored; and when the lifting part and the grip are kneaded, the grip can pull the turnover limiting member away from the wheel frame by the pull rod, and the torsion spring can act on the caster to rotate and attach to a lower portion of the carrying plate.

2. The portable folding wagon according to claim 1, wherein an adsorption member is fixed below the carrying plate, and the adsorption member can be adsorbed and connected to the caster by magnetic attraction.

3. The portable folding wagon according to claim 1, wherein the carrying plate is provided with an action port for a hand to insert, a cross bar is fixed below the carrying plate to attach to the lifting part, and the grip is slidably inserted between the lifting part and the cross bar and exposed in the action port.

4. The portable folding wagon according to claim 1, wherein when the casters are rotated and attached to a lower portion of the carrying plate, a storage cavity is formed between the plurality of casters.

5. The portable folding wagon according to claim 4, wherein a handle is rotatably mounted on the connecting rod, and the handle can be rotated into the storage cavity.

6. The portable folding wagon according to claim 5, wherein a rotation limiting member is slidably mounted on the connecting rod, the rotation limiting member can limit a rotation angle of the handle on the connecting rod with cooperation of a concave-convex structure, and a third spring is provided to elastically act on the rotation limiting member to attach to the handle.

7. The portable folding wagon according to claim 6, wherein one group of carrying plate assemblies is provided, and the handle can rotate to a lower portion of the carrying plate.

8. The portable folding wagon according to claim 6, wherein two groups of carrying plate assemblies are provided, the two groups of carrying plate assemblies are rotatably connected, the handle is rotatably mounted on a connecting rod in one group of carrying plate assemblies, two carrying plates can be turned downward and attached, and the handle can rotate to a position between the two carrying plates and is positioned in the storage cavity.

9. The portable folding wagon according to claim 8, wherein when the two carrying plates are horizontally unfolded, end surfaces between the carrying plates are attached to limit the upward turning of the two carrying plates.

10. The portable folding wagon according to claim 9, wherein a hooking and limiting member is rotatably mounted on the carrying plate, and the hooking and limiting member can hook and limit a relative rotation of the two carrying plates.

* * * * *